(12) United States Patent
Luoma et al.

(10) Patent No.: US 8,573,337 B1
(45) Date of Patent: Nov. 5, 2013

(54) TANDEM HOUSING

(75) Inventors: Trent A. Luoma, Dubuque, IA (US); Dharmendra Sharma, Bokaro Thermal (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/546,041

(22) Filed: Jul. 11, 2012

(51) Int. Cl.
*B60G 5/00* (2006.01)

(52) U.S. Cl.
USPC .................. 180/24.11; 180/378; 280/676

(58) Field of Classification Search
USPC .............. 180/24.01, 24.11, 378; 280/676
See application file for complete search history.

(56) References Cited

U.S. PATENT DOCUMENTS

| | | | | |
|---|---|---|---|---|
| 2,215,506 | A | * | 9/1940 | Hollmann et al. ......... 180/24.05 |
| 2,322,279 | A | * | 6/1943 | Collender .................. 180/24.11 |
| 3,142,352 | A | * | 7/1964 | Johansson ..................... 180/22 |
| 4,500,110 | A | * | 2/1985 | McWhorter et al. .......... 280/680 |
| 5,290,201 | A | * | 3/1994 | Tesker .......................... 460/116 |
| 7,832,509 | B2 | * | 11/2010 | Thomson et al. .......... 180/24.11 |

FOREIGN PATENT DOCUMENTS

GB 2184073 A * 6/1987

OTHER PUBLICATIONS

Background Information (1 page)(prior art before Jul. 11, 2012).

* cited by examiner

*Primary Examiner* — Nicole Verley

(57) ABSTRACT

A tandem housing for a motor grader comprises an exterior multi-layer first wall, an exterior second wall, and an exterior rim. The first wall comprises a main plate and a reinforcement plate reinforcing the main plate. The rim is coupled to the first wall and the second wall so as to provide a periphery of the tandem housing laterally between the first wall and the second wall. The main plate, the reinforcement plate, and the rim cooperate to provide a weld groove. A weld is positioned in the weld groove.

19 Claims, 5 Drawing Sheets

TANDEM HOUSING

FIELD OF THE DISCLOSURE

The present disclosure relates to a tandem housing for use with a tandem and axle of a work vehicle.

BACKGROUND OF THE DISCLOSURE

A motor grader, a type of work vehicle, typically has a tandem on the laterally opposite sides of the rear section of the motor grader. The tandems are coupled to a rear axle which provides a propulsion input to each tandem. With respect to each tandem, the propulsion input drives, for example, a pair of chains contained within the tandem housing of the tandem. The two chains drive respectively two propulsion outputs which drive respectively two ground-engaging wheels.

SUMMARY OF THE DISCLOSURE

According to an aspect of the present disclosure, a tandem housing for a work vehicle comprises an exterior multi-layer first wall, an exterior second wall, an exterior rim, and a weld. The first wall comprises a main plate and a reinforcement plate positioned on the main plate in face-to-face relation therewith so as to reinforce the main plate. The first wall comprises a propulsion input hole configured to receive a propulsion input of the work vehicle. The second wall comprises a first propulsion output hole configured to receive a first propulsion output of the work vehicle and a second propulsion output hole configured to receive a second propulsion output of the work vehicle. The first and second propulsion output holes are positioned on opposite sides of the propulsion input hole relative to a fore-aft dimension of the tandem housing. The rim is coupled to the first wall and the second wall so as to provide a periphery of the tandem housing laterally between the first wall and the second wall relative to a lateral dimension of the tandem housing perpendicular to the fore-aft dimension. The main plate, the reinforcement plate, and the rim cooperate to provide a weld groove. The weld is positioned in the weld groove in contact with the main plate, the reinforcement plate, and the rim so as to attach the main plate, the reinforcement plate, and the rim to one another.

The weld joint (i.e., the weld in the weld groove) promotes minimization of the weight of the tandem housing. Weight reduction of the tandem housing can at least partially accommodate for weight added to the work vehicle in the form of emissions equipment due, for example, to stricter emissions regulations (e.g., from interim Tier 4 to final Tier 4 emissions regulations of the Environmental Protection Agency). It is to be understood that weight reduction of the tandem housing may be pursued for any reason.

The above and other features will become apparent from the following description and the coupled drawings.

BRIEF DESCRIPTION OF THE DRAWINGS

The detailed description of the drawings refers to the accompanying figures in which.

DETAILED DESCRIPTION OF THE DRAWINGS

Figure 1:
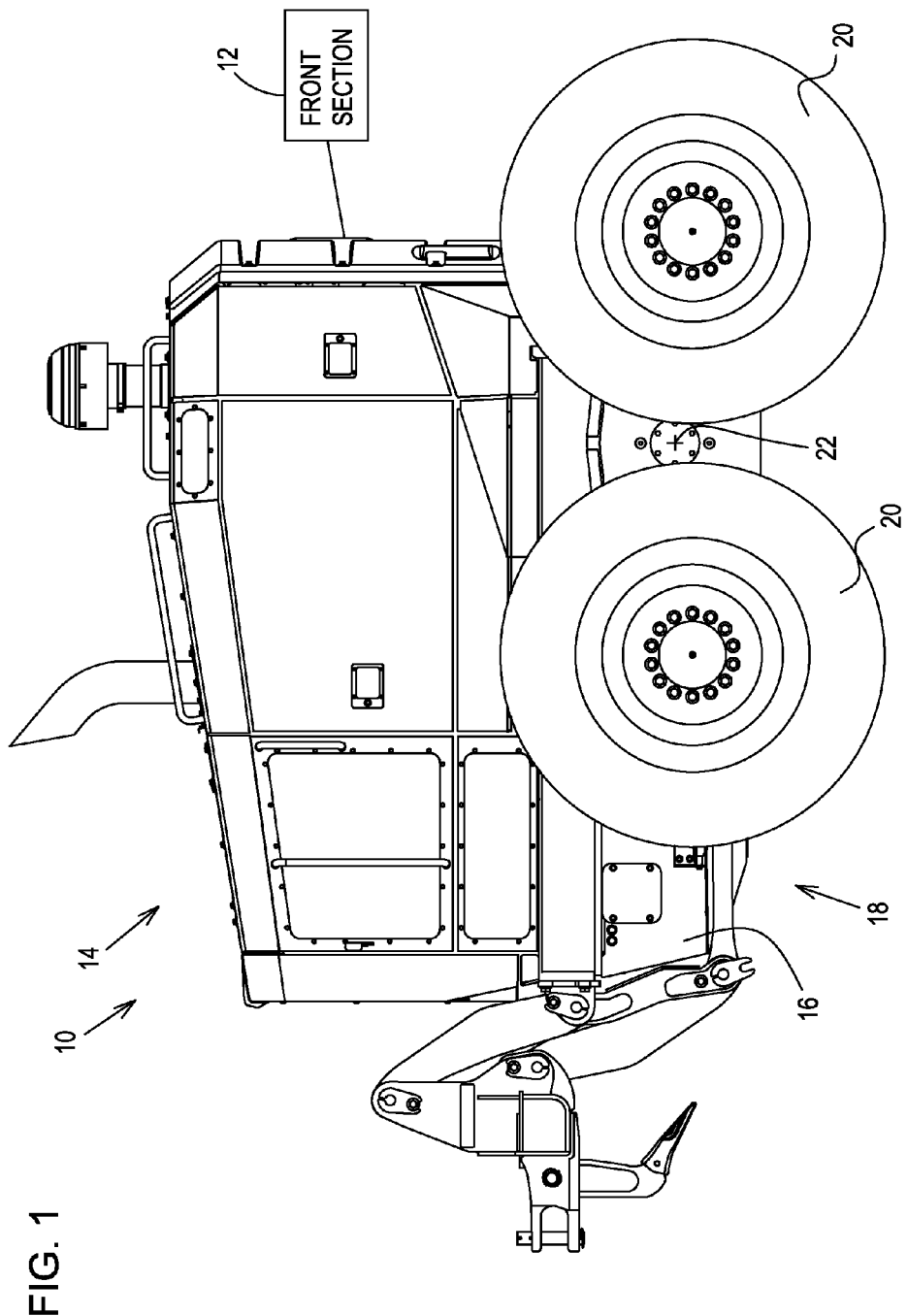
FIG. 1 is a side elevational view showing a motor grader that includes a rear section which has a tandem on each side of the motor grader, the right tandem being shown.

Referring to FIG. 1, a motor grader 10 has a front section 12 and a rear section 14. The front section 12, shown diagrammatically, includes two front wheels, the moldboard, and an operator's station. The rear section 14 includes a rear frame 16 and two tandems 18 coupled to the frame 16 and positioned on opposite sides of the rear section 14, the right tandem shown, for example, in FIG. 1 and representative of the left tandem. Each tandem 18 has two ground-engaging wheels 20 and is pivotable about a tandem axis 22 between the wheels 20 to adjust to uneven terrain so as to promote traction and minimize vertical motion of the motor grader 10.

Figure 2:
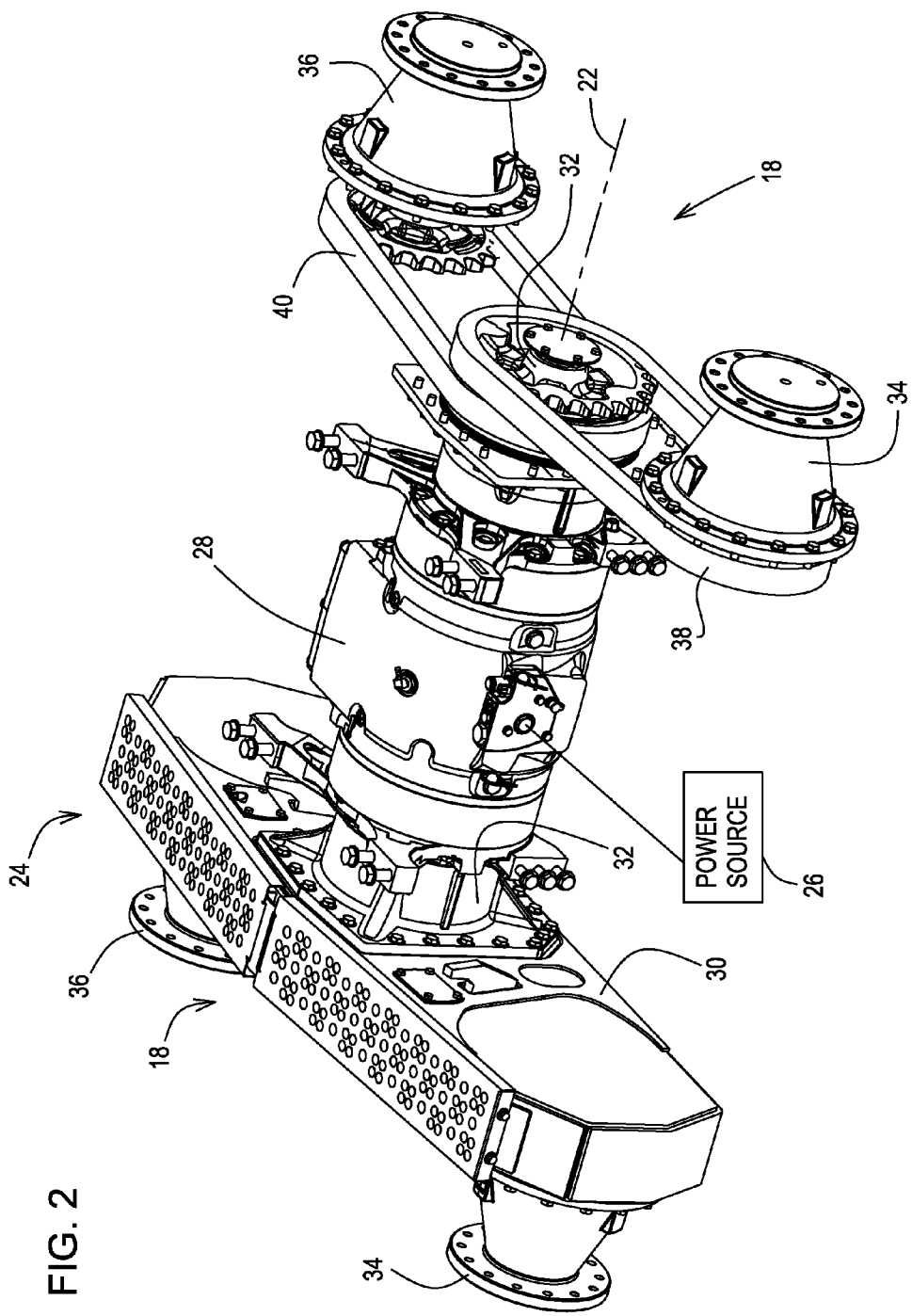
FIG. 2 is a perspective view showing a propulsion system of the motor grader.

Referring to FIG. 2, the motor grader 10 includes a fixed-drive propulsion system 24 for propelling the rear section 14. The propulsion system 24 includes a power source 26, in the form of, for example, an internal combustion engine and a transmission coupled to the engine, and an axle 28 coupled to the power source 26 so as to be driven thereby.

The tandems 18 are included in the propulsion system 24. Each tandem 18 (shown with the wheels 2 in FIG. 2) includes a tandem housing 30, a propulsion input 32 coupled to a respective end of the axle 28 so as to be driven thereby and coupled to the housing 30, a first propulsion output 34 coupled to the housing 30, a second propulsion output 36 coupled to the housing 30, a first chain 38 positioned within the housing 30 and interconnecting drivingly the input 32 and the output 34, and a second chain 40 positioned within the housing 30 and interconnecting drivingly the input 32 and the output 36 (the chains 38, 40 are shown in simplified form for ease of illustration). The housing 30 of the right tandem 18 is removed in FIG. 2 in order to show interior components of the tandems 18.

The input 32 of a tandem 18 extends into the housing 30, and may be configured in any suitable manner. For example, the input 32 includes a shaft and two sprockets mounted on the shaft so as to rotate therewith about the axis 22.

Each output 34 of a tandem 18 may be configured in any suitable manner. For example, each output 34 includes a final drive, a shaft coupled drivingly to the final drive, and a sprocket mounted on the shaft.

With respect to each tandem 18, the propulsion input 32 is coupled drivingly to the propulsion outputs 34, 36. The first chain 38 is trained about one of the sprockets of the input 32 and the sprocket of the first propulsion output 34. The second chain 40 is trained about the other of the sprockets of the input 32 and the sprocket of the second propulsion output 36.

Figure 3:
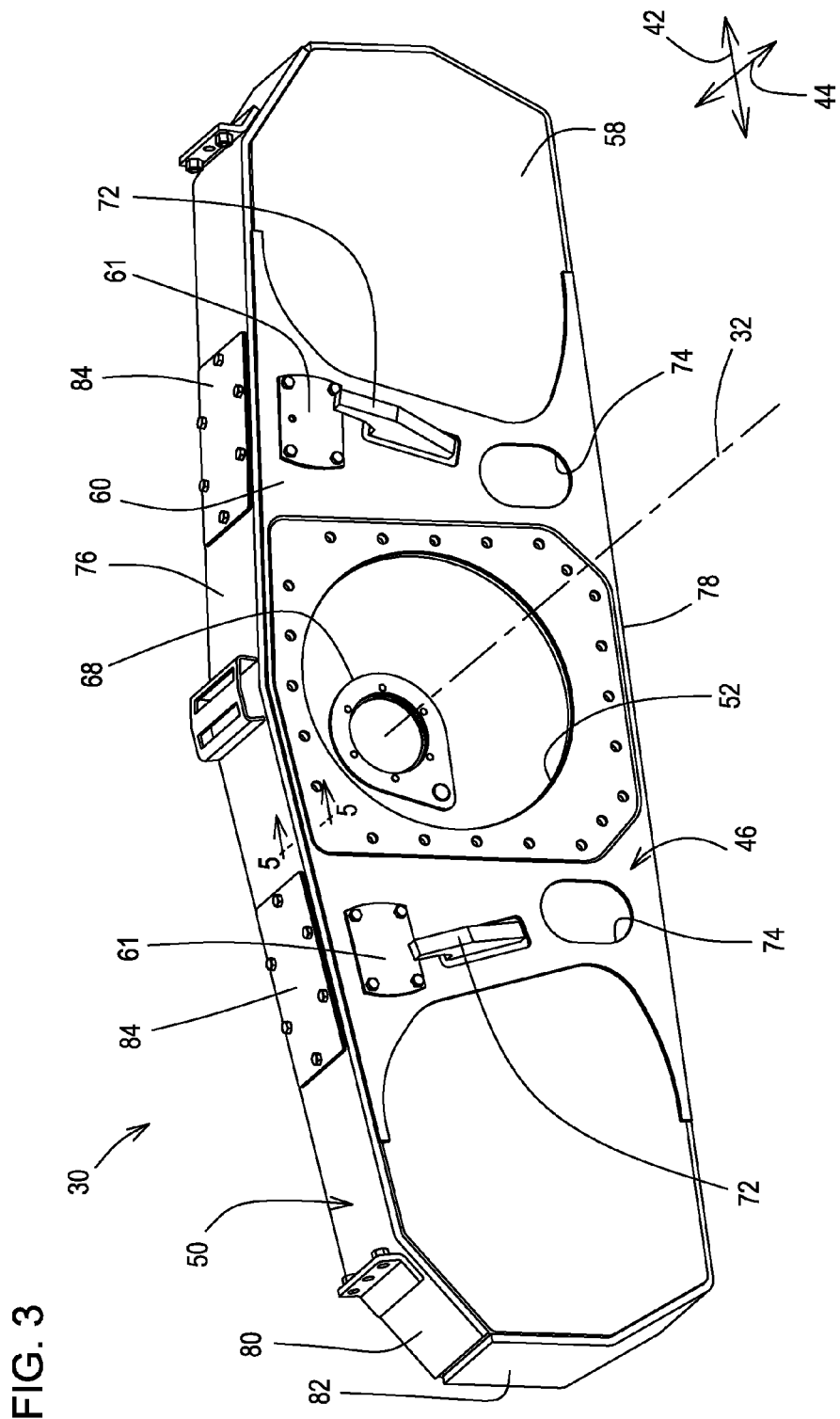
FIG. 3 is a perspective view showing an inboard side of a tandem housing of each tandem.
Figure 4:
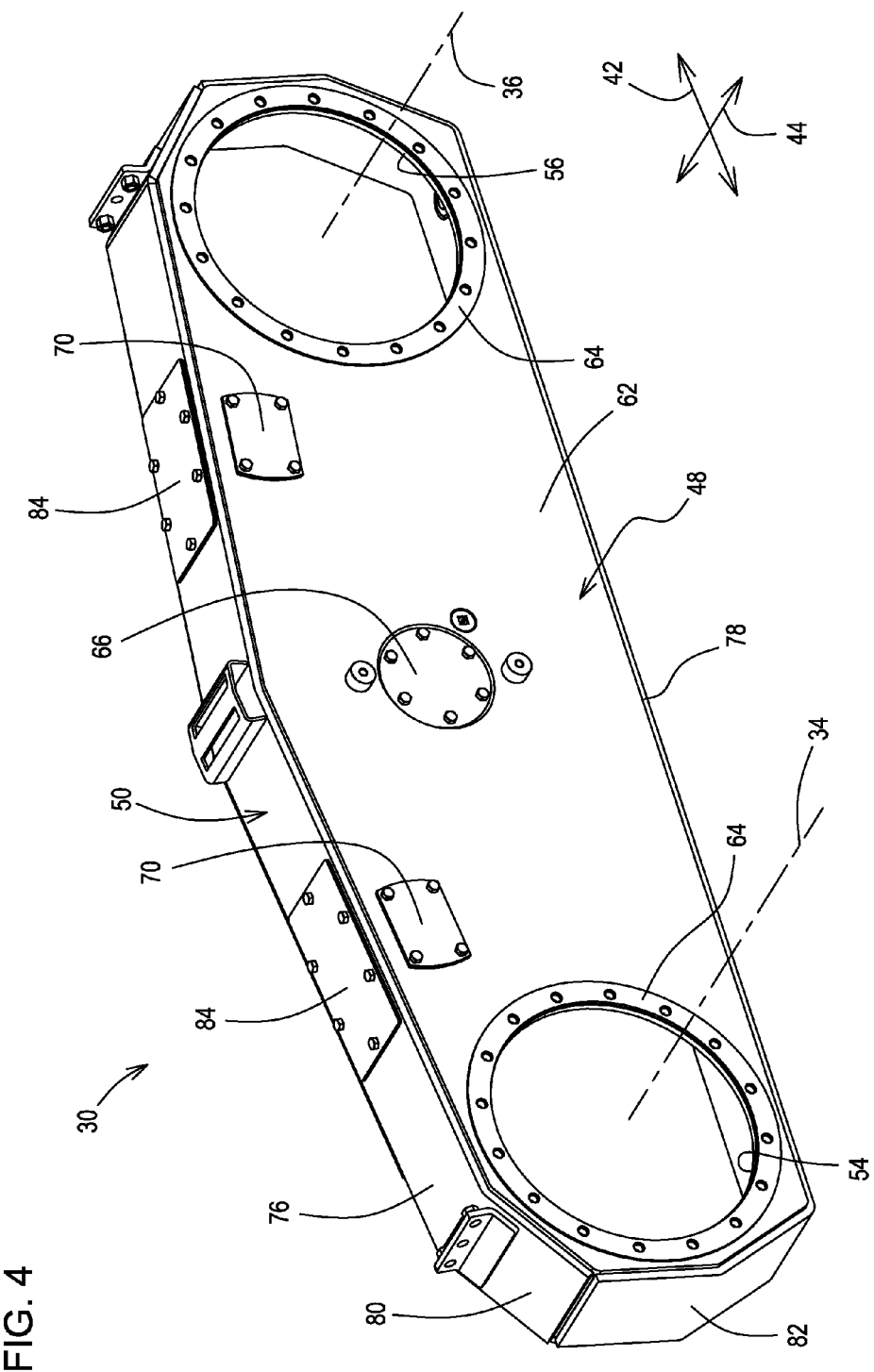
FIG. 4 is a perspective view showing an outboard side of the tandem housing of each tandem.

Referring to FIGS. 3 and 4, the tandem housing 30 of each tandem 18 the has a fore-aft dimension 42 that corresponds to the fore-aft dimension of the motor grader 10 and a lateral dimension 44 that is perpendicular to the fore-aft dimension 42 and corresponds to the lateral dimension of the motor grader 10. The tandem housing 30 includes an exterior multi-layer inboard or first wall 46, an exterior outboard or second wall 48, and an exterior rim 50 coupled to the first wall 46 and the second wall 48 so as to provide a periphery of the tandem housing 30 laterally between the first wall 46 and the second wall 48 relative to the lateral dimension 44 of the tandem housing 30. The first wall 46 includes a propulsion input hole 52 receiving a propulsion input 32. The second wall 48 includes a first propulsion output hole 54 receiving a first propulsion output 34 and a second propulsion output hole 56 receiving a second propulsion output 36. The first and second propulsion output holes 54, 56 are positioned on opposite sides of the propulsion input hole 52 relative to the fore-aft dimension 42.

Referring to FIG. 3, the first wall 46 includes a main plate 58 and a reinforcement plate 60. The reinforcement plate 60 is positioned on the main plate 58 laterally inboard of the main plate 58 relative to the lateral dimension 44. The reinforcement plate 60 is positioned in face-to-face relation with the main plate 58 so as to reinforce the main plate 58 in relatively high stress areas. Such reinforcement promotes minimization of the thickness of the main plate 58 and thus promotes weight reduction of the tandem housing 30.

Two covers 61 are coupled detachably to the first wall for removal therefrom to allow access to the chains 38, 40.

Two stops 72 are positioned respectively in two holes formed in the reinforcement plate 60 and are welded to the main plate 58. The stops 72 limit rotation of the tandem 18 about the axis 22 (e.g., 15 degrees from neutral in a forward direction and 15 degrees from neutral in a rearward direction).

Two weight-reduction holes 74 are formed in the reinforcement plate 60. The holes 74 are in relatively low stress areas, so are eliminated from the plate 60.

The main plate 58 and the reinforcement plate 60 are welded to one another. The plates 58, 60 and the rim 50 are welded to one another along a laterally inboard portion of a top side 76 of the housing 30 and along a laterally inboard portion of a bottom side 78 of the housing 30, as discussed in more detail herein. The main plate 58 is welded to the rim 50 along the end portions of the housing 30, i.e., in the areas where the reinforcement plate 60 is not present (e.g., all along those end portions with a 7 millimeter fillet). As such, the first wall 46 and the rim 50 are welded to one another all the way around the first wall 46. The plates 58, 60 are welded to one another at the holes 74 (e.g., all the way around each hole 74 with a 6 millimeter fillet) and are welded to one another at the generally C-shaped end edges 76 of the reinforcement plate 60 (e.g., all the way along each edge 76 with a 6 millimeter fillet). The plates 58, 60 are thus exemplarily welded to one another all the way around the outer periphery of the reinforcement plate 60.

Referring to FIG. 4, the second wall 48 includes a main plate 62 and two reinforcement rings 64. The main plate 62 is welded to the rim 50 (e.g., main plate 62 is welded all the way around with a 7 millimeter fillet).

The reinforcement rings 64 are positioned respectively at the output holes 54, 56 so as to partially define those holes and are welded to the main plate 62 so as to reinforce the main plate 62 in a relatively high stress area (e.g., each ring 64 welded all the way around its outer diameter with, for example, 6 millimeter fillet). Such reinforcement promotes minimization of the thickness of the main plate 62 and thus promotes weight reduction of the tandem housing 30.

A center inspection cover 66 is coupled detachably to the main plate 62 for removal therefrom to allow inspection of the input 32. The cover 66 is fastened to main plate 62 with fasteners that extend through the main plate 62 into a reinforcement plate 68 welded to the main plate 62 in the interior of the housing 30 (e.g., outer periphery skip-welded to main plate 62 with 3 millimeter fillet). Two covers 70 are coupled detachably to the main plate 62 for removal therefrom to allow access to the chains 38, 40.

The rim 50 includes a generally C-shaped top plate 80 along the top side 76 of the housing 30 and a generally U-shaped bottom plate 82 along the bottom side 78 of the housing 30. The plates 80, 82 are welded to one another at two lateral seam between the plates 80, 82, the seams positioned respectively at corresponding locations of the end portions of the housing 30 [e.g., welded all the way along each seam with a fillet that is 11 millimeters (in the dimension of the thickness of the plates 80, 82)×14 millimeters (representing the gap between the end edges of the plates 80, 82)]. The rim 50 includes, for example, two inspection plates 84 detachably coupled to the top plate 80 with fasteners for removal therefrom to allow inspection into the interior region of the housing 30.

Figure 5:
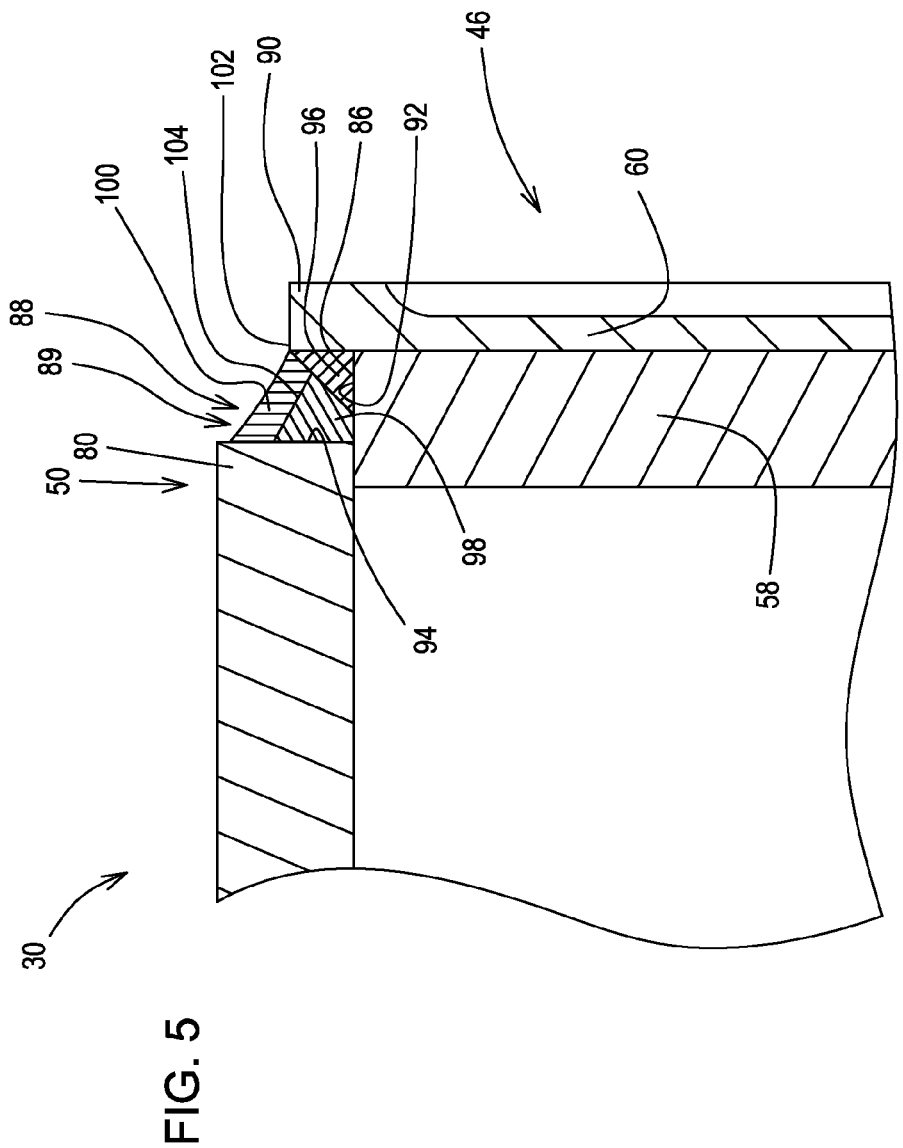
FIG. 5 is a sectional view taken along lines 5-5 of FIG. 3, with portions broken away, showing a weld joint of the tandem housing.

Referring to FIG. 5, the main plate 58, the reinforcement plate 60, and the rim 50 are welded to one another. The main plate 58, the reinforcement plate 60, and the rim 50 cooperate to provide a top or first weld groove 86 along the laterally inboard portion of the top side 76 of the housing 30 and a bottom or second weld groove that is along the laterally inboard portion of the bottom side 78 of the housing 30 and is similar to the first weld groove. The top side 76 includes the first weld groove, and the bottom side 78 includes the second weld groove. As such, the top plate 80 of the rim 50 provides a portion of the first weld groove, and the bottom plate 82 of the rim 50 provides a portion of the second weld groove. The first weld groove extends, for example, all the way along the length of the top or first seam between the rim 50 and the plates 58, 60 on the top side 76, and the second weld groove extends, for example, all the way along the length of the bottom or second seam between the rim 50 and the plates 58, 60 on the bottom side 78.

The housing 30 includes a top or first weld 88 that is positioned in the first weld groove in contact with the main plate 58, the reinforcement plate 60, and the rim 50 so as to weld and thus couple the plates 58, 60 and the rim 50 to one another and includes a bottom or second weld that is similar to the first weld and is positioned in the second weld groove in contact with the main plate 58, the reinforcement plate 60, and the rim 50 so as to weld and thus couple the plates 58, 60 and the rim 50 to one another. The first weld extends, for example, all the way along the length of the first weld groove, and the second weld extends, for example, all the way along the length of the second weld groove. The first weld in the first weld groove cooperates to provide a top or first weld joint 89, and the second weld in the second weld groove cooperates to provide a bottom or second weld joint similar to the first weld joint.

Since the first and second weld grooves are similar to one another, only the first weld groove 86 is shown (FIG. 5) and described further, the second weld groove being represented thereby. Since the first and second welds are similar to one another, only the first weld 88 is shown (FIG. 5) and described further, the second weld being represented thereby.

The main plate 58, the reinforcement plate 60, and the rim 50 cooperate to provide the weld groove 86. The main plate 58 and the reinforcement plate 60 are arranged relative to one another in a lap joint configuration partially forming the weld groove 86. A portion 90 of the reinforcement plate 60 extends beyond a peripheral edge 92 of the main plate 58. The rim 50 and the main plate 58 are arranged relative to one another in a corner joint configuration partially forming the weld groove 86 (e.g., the rim 50 overlaps the peripheral edge 92 of the main plate 58 in a partially open corner joint configuration). As such, the portion 90 of the reinforcement plate 60, the peripheral edge 92 of the main plate 58, and a peripheral edge 94 of the rim 50 cooperate to provide the weld groove 86. The weld 88 contacts the portion 90 of the reinforcement plate 60, the peripheral edge 92 of the main plate 58, and the peripheral edge 94 of the rim 50.

The weld 88 includes weld beads applied in multiple passes (e.g., the same number of passes as weld beads). The weld beads are applied manually in multiple passes. The weld beads are positioned, for example, in layered relation to one another. The weld beads include, for example, a first weld bead 96, a second weld bead 98, and a third weld bead 100. The weld beads 96, 98, 100 extend, for example, the length of the weld groove 86. The weld beads may be applied manually or with a robotic weld machine.

The first weld bead 96 contacts the main plate 58 and the reinforcement plate 60. The first weld bead 98 contacts the portion 90 of the reinforcement plate 60 and the peripheral edge 92 of the main plate 58 so as to provide a fillet therebetween. The first weld bead 96 is used to join the plates 58, 60 together as a sub-assembly before the sub-assembly is joined to the rim 50.

The second weld bead 98 contacts the rim 50 and the main plate 58. The second weld bead 98 contacts the peripheral edge 94 of the rim 50 and the peripheral edge 92 of the main plate 58 so as to provide a fillet therebetween and contacts the first weld bead 98. The second weld bead 98 joins the sub-assembly of the plates 58, 60 and the rim 50 to one another.

The third weld bead 100 contacts the rim 50, the reinforcement plate 60, the first weld bead 96, and the second weld bead 98. The third weld bead 100 contacts the peripheral edge 94 of the rim 50 and the portion 90 of the reinforcement plate 58. The first and second weld beads 96, 98 cooperate to form a V-shaped groove 104 in which the third weld bead 100 is positioned. The third weld bead 100 extends to the peripheral edge 102 of the reinforcement plate 58 included in the portion 90 to maximize the strength of the connection of the weld 88 to the reinforcement plate 58. The third weld bead 100 extends to the edge 102 so as to "burn" the outboard corner of the edge 102 (i.e., the corner next to the weld 88), which may result in scalloping of that corner along its length. The third weld bead 100 does not extend out to the outer corner of the rim 50, although it could in other embodiments so as to "burn" that corner possibly scalloping that corner along its length.

The weld beads 96, 98, 100 are positioned in layered relation to one another. The third weld bead 100 forms a layer on the first weld bead 96 and the second weld bead 98. Exemplarily, the second weld bead 98 is positioned at least partially between the first and third weld beads 96, 100.

Each weld 88 may have any suitable number of weld beads. As in the illustrated example, it may have three weld beads. In other examples, it may have a single weld bead produced in one pass using, for example, a robotic weld machine. It is understood that each weld 88 may be applied manually or with a robotic weld machine, regardless of the number of weld beads included in the weld 88.

The propulsion system 24 may use other forms of power transmission within each tandem housing 30. For example, gears or other power transmission devices may be used instead of a chain drive.

Except in FIG. 5 with respect to the weld 88, the welds and the fastener threads have not been shown in the drawings for simplification of illustration, it being understood that it would be well within the skill of one of ordinary skill in the art to provide those features without undue experimentation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A tandem housing for a work vehicle, the tandem housing having a fore-aft dimension and a lateral dimension perpendicular to the fore-aft dimension, the tandem housing comprising:
    an exterior multi-layer first wall, the first wall comprising a main plate and a reinforcement plate positioned on the main plate in face-to-face relation therewith so as to reinforce the main plate,
    an exterior second wall, the first wall comprising a propulsion input hole configured to receive a propulsion input of the work vehicle, the second wall comprising a first propulsion output hole configured to receive a first propulsion output of the work vehicle and a second propulsion output hole configured to receive a second propulsion output of the work vehicle, the first and second propulsion output holes positioned on opposite sides of the propulsion input hole relative to the fore-aft dimension of the tandem housing,
    an exterior rim coupled to the first wall and the second wall so as to provide a periphery of the tandem housing laterally between the first wall and the second wall relative to the lateral dimension of the tandem housing, the main plate, the reinforcement plate, and the rim cooperating to provide a weld groove, and
    a weld positioned in the weld groove in contact with the main plate, the reinforcement plate, and the rim so as to attach the main plate, the reinforcement plate, and the rim to one another.

2. The tandem housing of claim 1, wherein the weld comprises weld beads.

3. The tandem housing of claim 2, wherein the weld beads are positioned in layered relation to one another.

4. The tandem housing of claim 2, wherein the weld beads comprises a first weld bead contacting the main plate and the reinforcement plate, a second weld bead contacting the rim and the main plate, and a third contacting the rim and the reinforcement plate, the first and second weld bead contact one another, and the third weld bead contacts the first weld bead and the second weld bead.

5. The tandem housing of claim 2, wherein the weld beads comprise a weld bead contacting the main plate and the reinforcement plate.

6. The tandem housing of claim 5, wherein the weld bead is a first weld bead, and the weld beads comprise a second weld contacting the rim, the main plate, and the first weld bead.

7. The tandem housing of claim 5, wherein the weld bead is a first weld bead, and the weld beads comprises a second weld bead contacting the rim, the reinforcement plate, and the first weld bead.

8. The tandem housing of claim 1, wherein the rim and the main plate are arranged relative to one another in a corner joint configuration partially forming the weld groove.

9. The tandem housing of claim 8, wherein the main plate and the reinforcement plate are arranged relative to one another in a lap joint configuration partially forming the weld groove.

10. The tandem housing of claim 1, wherein the main plate and the reinforcement plate are arranged relative to one another in a lap joint configuration partially forming the weld groove.

11. The tandem housing of claim 1, wherein a portion of the reinforcement plate extends beyond a peripheral edge of the main plate, the portion of the reinforcement plate, the peripheral edge of the main plate, and a peripheral edge of the rim cooperate to provide the weld groove, and the weld contacts the portion of the reinforcement plate, the peripheral edge of the main plate, and the peripheral edge of the rim.

12. The tandem housing of claim 11, wherein the rim overlaps the peripheral edge of the main plate.

13. The tandem housing of claim 11, wherein the weld comprises weld beads positioned in layered relation to one another.

14. The tandem housing of claim 13, wherein the weld beads comprise a first weld bead contacting the portion of the reinforcement plate and the peripheral edge of the main plate so as to provide a fillet therebetween, a second weld bead contacting the peripheral edge of the rim and the peripheral edge of the main plate so as to provide a fillet therebetween and contacting the first weld bead, a third weld bead contacting the first weld bead, the second weld bead, the peripheral edge of the rim, and the portion of the reinforcement plate and forming a layer on the first weld bead and the second weld bead, and the third weld bead extends to a peripheral edge of the reinforcement plate included in the portion of the reinforcement plate.

15. The tandem housing of claim 14, wherein the first and second weld beads cooperate to form a V-shaped groove in which the third weld bead is positioned.

16. The tandem housing of claim 1, comprising a top side and a bottom side, and the top side comprises the weld groove.

17. The tandem housing of claim 16, wherein the weld groove is a first weld groove, the weld is a first weld, the main plate, the reinforcement plate, and the rim cooperate to provide a second weld groove, and the bottom side comprises the second weld groove, and comprising a second weld positioned in the second weld groove in contact with the main plate, the reinforcement plate, and the rim so as to attach the main plate, the reinforcement plate, and the rim to one another, the bottom side comprising the second weld groove.

18. The tandem housing of claim 16, comprising a top side and a bottom side, and the bottom side comprises the weld groove.

19. A work vehicle comprising the tandem housing of claim 1, a propulsion input received by the propulsion input hole, a first propulsion output received by the first propulsion output hole, and a second propulsion output received by the second propulsion output hole.

* * * * *